United States Patent

Rittler

Patent Number: 5,173,454
Date of Patent: Dec. 22, 1992

[54] NANOCRYSTALLINE MATERIALS

[75] Inventor: Hermann L. Rittler, Corning, N.Y.

[73] Assignee: Corning Incorporated, Corning, N.Y.

[21] Appl. No.: 818,347

[22] Filed: Jan. 9, 1992

[51] Int. Cl.$^5$ ............................................. C03C 10/00
[52] U.S. Cl. .......................................... 501/5; 501/3;
501/10; 501/45; 501/63
[58] Field of Search .................. 501/3, 4, 5, 10, 45, 501/63

[56] References Cited

U.S. PATENT DOCUMENTS

| | | | |
|---|---|---|---|
| 2,215,039 | 9/1940 | Hood et al. | 501/54 X |
| 2,286,275 | 6/1942 | Hood et al. | 501/65 X |
| 2,480,672 | 8/1949 | Plank | 501/39 X |
| 4,233,169 | 11/1980 | Beall et al. | 501/39 X |
| 4,676,929 | 6/1987 | Rittler | 501/148 X |
| 4,687,750 | 8/1987 | Pinckey | 501/10 |
| 4,826,628 | 5/1989 | Rittler | 501/145 X |
| 4,952,388 | 8/1990 | Rittler | 501/148 X |
| 5,091,115 | 2/1992 | Nogami | 501/10 X |

*Primary Examiner*—Karl Group
*Attorney, Agent, or Firm*—Milton M. Peterson; Clinton S. Janes, Jr.

[57] ABSTRACT

Glass or crystal particles of nanocrystalline size having a minor dimension of 0.1 to 100 Angstrom units. They may be prepared by controlled thermal separation of phase-separable glasses. Preferred crystal forms are zinc pyrophosphate and lithium disilicate. A crystallizable glass is combined with phyllosilicate particles and sintered to form an oriented composite body. During slow sintering, the crystal grows epitaxially on the phyllosilicate.

3 Claims, No Drawings

NANOCRYSTALLINE MATERIALS

FIELD OF THE INVENTION

The field is glass and glass-ceramic materials in particulate form.

BACKGROUND OF THE INVENTION

The invention relates to glass and glass-ceramic particles of nanocrystalline size. It is further concerned with methods of producing materials of such minute particle size.

The term "nanocrystalline" refers to particles having a diameter or thickness on the order of a nanometer. More particularly, it is here used to refer to particles in the size range of 0.1 to 100 Angstrom units. Such minute particles are characterized by large surface areas, as measured by the nitrogen absorption (BET) method.

Particles of nanocrystalline size are of interest in diverse applications. In general, they react with each other, or with other materials, at lower temperatures than are normally required for the same reaction of such materials in a bulk state. Thus, they are of particular value in forming composite materials with either organic or inorganic reactants.

It is known to delaminate phyllosilicate materials to produce platelets of nanocrystalline size. It is a purpose of the present invention to provide particles of corresponding size from glass and glass-ceramic materials.

SUMMARY OF THE INVENTION

The material aspect of my invention is glass, or glass-ceramic crystalline, particles in the size range of 0.1 to 100 Angstrom units. It further resides in inorganic, or inorganic-organic, composite materials produced from such particles. A particular embodiment is a material embodying phosphorous-nitrogen bonding and resulting from reacting an ammonium compound with phosphate glass particles.

The invention further resides in a method of producing glass, or glass-ceramic crystalline, particles in the size range of 0.1 to 100 Angstrom units. The method comprises providing a precursor phase-separable glass, preferably a phosphate glass capable of being separated into a stable crystalline or glassy phase and a soluble matrix phase, separating the precursor glass into two phases at a rate controlled to favor small particle formation of a stable glass or crystal phase, and solubilizing the matrix, to leave the stable phase in particulate form. In one embodiment, the glass is crystallizable and a crystal phase is separated by heating at the low end of its crystallizing temperature range to provide a fine crystalline phase. In other embodiments, the particles formed are reacted with an ammonium and or a halide compound.

PRIOR ART

It is known from my prior United States patents to delaminate phyllosilicates to particle sizes below 1000 Angstrom units and as small as unit cell size. No. 4,826,628 describes heating a phyllosilicate in a reactive vapor phase, preferably hydrogen-containing; No. 4,952,388 describes an acid treatment; No. 4,836,954 describes fluorinating a phyllosilicate by reaction with a compound such as $NH_4HF_2$; No. 4,676,929 describes treating a phyllosilicate with an aminocarboxy acid to delaminate and produce a gel.

It is also well known in the glass art to separate a glass into phases of differing solubilities, and to remove the soluble phase to produce a porous glass composed of the stable phase. An early disclosure of this procedure, as used with phase-separable borosilicate glasses, is found in U.S. Pat. Nos. 2,215,039 and 2,286,275 (Hood borosilicate glass containing 5-15% $Al_2O_3$ and 7-24% $P_2O_5$.

U.S. Pat. Nos. 4,233,169 and 4,395,271 (Beall et al.) describe producing bodies of magnetic glass and/or crystal-containing materials with magnetic crystals. The bodies are produced by phase-separation, followed by acid etching of a soluble phase.

U.S. Pat. No. 3,650,721 (Hammel et al.) describes a process of phase separation and leaching to produce micro-porous fibers and granules for smoke filters that have a minor axis length of 0.5 to 1000 microns.

DESCRIPTION OF THE INVENTION

The present invention provides crystalline particles of nanometer dimensions from precursor glasses and glass-ceramics. It is particularly concerned with platey-type crystals having high aspect ratios. These are similar in nature to particles obtained by delaminating phyllosilicate minerals such as vermiculite.

Nanocrystalline particles are characterized by high surface areas that may be several times greater than surface areas on larger size particles of the same composition. Such nanocrystalline size particles may exhibit excellent thermal and chemical stabilities over a wide range of stoichiometries. Because of their minute size and geometry, they tend to pack tightly and sinter to near theoretical density after pressing or extrusion.

The invention further relates to generation of improved chemical and physical properties in such materials via diffusion reactions. These reactions occur during thermal, gas phase treatments of the nanocrystalline materials. In particular, unique reactions occur with phosphorus-containing materials, such as phosphate glass-ceramics. Also, treatment of phosphate glass particles with anhydrous ammonia has produced substantial improvement in durability and thermal stability. Fourier Transform-Infra Red (FT-IR) analyses have shown P-N bonding as a result of such reactions.

It is also possible to generate new phosphate material stoichiometries as a result of reactions with various aqueous hydrogen ion-containing reactants. These include such reactants as $NH_4HF_2$, $NH_4HF$ and $C_2H_7O_2N$. Substantial amounts of halide ions may be introduced by reaction with the ammonium halides.

In addition to diffusion-altered phosphates, as noted above, an area of particular interest is superplastic ceramic composites. Also, of interest for filtration and for biomedical applications, are materials with extremely fine pores. Another application is low density microfoams.

Nanocrystalline materials may be obtained from phase separated glasses wherein the separated phase is either a second glassy phase or a crystalline phase. In either case, a soluble glass matrix is provided that can be readily leached to leave the more stable glass or crystal particles.

In the case of the crystallized glass, that is, a glass-ceramic, fine crystals are obtained by so controlling the nucleation and crystallizing heat treatment that numerous nuclei develop. In general, fine crystal development is favored by inducing crystal growth at the lower end of the temperature range within which crystallization occurs, which practice requires longer heat treatment times. This heat treatment at low temperatures causes a greater number of nuclei to form, resulting in many small, fine crystals, rather than fewer, large crystals to develop.

The invention is further described with respect to certain specific embodiments which are presently considered to be the best mode of practice.

TABLE I sets forth compositions, in percent by weight as calculated from the glass batch, for crystallizable phosphate glasses. These compositions were formulated to provide a pyrophosphate crystal phase, in particular, zinc pyrophosphate, when heat treated. Batches were prepared from conventional materials and melted in crucibles for 4 hours at 1200° C. Each glass melt was quenched to provide a clear glass that could be crystallized by a controlled heat treatment.

TABLE I

| | Example | | |
|---|---|---|---|
| | 1 | 2 | 3 |
| $P_2O_5$ | 46.5 | 50.0 | 47.9 |
| ZnO | 32.8 | 37.0 | 35.8 |
| $Al_2O_3$ | 2.4 | 3.4 | 2.0 |
| SnO | 6.9 | — | — |
| $Li_2O$ | 2.2 | 2.4 | 1.8 |
| $Na_2O$ | 5.3 | 5.2 | 4.3 |
| $K_2O$ | — | — | 6.6 |
| S.A. | 2.4 | 1.1 | |

S.A. indicates surface area in square meters per gram ($m^2/gm$) as measured by BET nitrogen absorption.

Each of the glasses was heat treated to cause crystallization of a zinc pyrophosphate crystal phase in a glassy matrix. Crystallization could occur over a range of 300° to 600° C. with times varying from one-half hour at the high end of the range to as long as ten hours at the low end. In general, finer crystals are obtained with lower temperatures for longer times.

Each glass-ceramic thus produced was then exposed to different vapor phase reactions to determine the effect of such treatment. These treatments were at temperatures adapted to provide the reactant material employed in a vapor phase form. Thus, ammonium acid fluoride ($NH_4HF$) was employed at temperatures on the order of 125°–135° C. for times ranging up to four hours.

Thereafter, the crystals were chemically analyzed to determine gases diffused into the crystal. Also, surface areas were measured to compare with the precursor.

TABLE II shows the vapor phase treatments for each example of TABLE I, together with the changes effected by such treatments:

TABLE II

| Ex. | Vapor Phase | S.A. | H | N | F | Cl |
|---|---|---|---|---|---|---|
| 1 | $NH_4HF_2$ | 15.5 | — | 3.7 | 7.9 | — |
| 1 | $NH_4HF$ | 9.2 | — | 4.2 | 7.0 | — |
| 1 | $NH_4Cl$ | 16.6 | — | 1.5 | — | 0.2 |
| 1 | Control | 2.4 | — | 0.1 | 0.0 | — |
| 2 | $NH_4HF_2$ | 17.6 | — | 4.4 | 8.3 | — |
| 2 | $NH_4HF$ | 11.2 | — | 5.3 | 8.2 | — |
| 2 | $NH_4Cl$ | 6.9 | — | 0.5 | — | 0.0 |
| 2 | Control | 1.1 | — | 0.1 | 0.0 | — |
| 3 | $NH_4HF_2$ | 13.3 | | 3.7 | 10.7 | — |
| 3 | $NH_4HF$ | 11.7 | 1.6 | 4.7 | 8.3 | — |
| 3 | $NH_4Cl$ | 17.3 | 1.3 | 3.3 | — | 0.7 |
| 3 | $C_2H_7O_2N$ | 22.0 | 1.7 | 4.3 | — | — |
| 3 | Control | | | | | |

TABLE III sets forth, in weight percent calculated on an oxide basis, compositions of glasses that were crystallized, as described above, to glass-ceramics having crystals of nanocrystalline size;

TABLE III

| | Example | | |
|---|---|---|---|
| | 4 | 5 | 6 |
| $SiO_2$ | 58 | 47.5 | — |
| $B_2O_3$ | — | 11 | — |
| $Al_2O_3$ | 26.4 | 29 | 1.5 |
| $Bi_2O_3$ | — | — | 52.3 |
| $P_2O_5$ | 8.16 | — | — |
| MgO | 1.4 | — | — |
| CaO | — | — | 9.7 |
| SrO | — | — | 18.0 |
| ZnO | — | 10 | — |
| CuO | — | — | 18.5 |
| $ZrO_2$ | 2.4 | — | — |
| $TiO_2$ | 3.1 | — | — |
| $Na_2O$ | 0.14 | — | — |
| $K_2O$ | — | 2 | — |
| F | 0.4 | — | — |
| $Cr_2O_3$ | — | 0.1 | — |
| $As_2O_5$ | — | 0.4 | — |

Each of Examples 4–6 was reduced to particulate form preparatory to further treatment.

Example 4 was exposed to a 4 molar solution of $NH_4HF_2$, washed twice with distilled water and dried at 150° c. Chemical analysis of the dried material showed only minor changes in the original constituents, except for silica and $P_2O_5$. The amounts of these oxides were reduced to 19.5% and 3.0%, respectively. Meanwhile, nitrogen and fluorine contents of 8.6% and 36.8%, respectively, were observed in the analysis.

Example 5 was treated in the same manner as Example 4, except for a third washing before drying. The analysis of this material, after treatment, showed a N content of 2.5% and a F content of 9.3%. Measurement of surface area showed a value of 32.2 $m^2$/gram.

Samples of Example 6 were treated with 4 molar solutions of $NH_4HF_2$, $NH_4F$ and $NH_4Cl$. Analyses of the treated samples showed the following values:

TABLE IV

| | $NH_4HF_2$ | $NH_4F$ | $NH_4Cl$ |
|---|---|---|---|
| N | <0.05 | 0.24 | 0.34 |
| F | 18.7 | 17.2 | — |
| Cl | — | — | 11.1 |
| S.A. | 26.6 | 41.4 | 69.9 |

S.A. = surface area.

I have further found that composite bodies, capable of sintering to full density, can be made by extruding and sintering combinations of high aspect ratio phyllosilicates and glasses that crystallize at low temperatures to glass-ceramics having a circular or bladed morphologies. Preferably, the phyllosilicates have aspect ratios of at least 5:1. The resulting sintered composite bodies have excellent gas permeability and dielectric properties and moderate coefficients of thermal expansion, exhibit excellent toughness, and are relatively inexpensive to produce because of low melting and processing temperatures.

The preferred phyllosilicate to employ is talc or vermiculite that has been exposed to a vapor phase reaction such as described in my U.S. Pat. Nos. 4,826,628 and No. 4,836,954. These materials have surface areas of 7 and 12 $m^2$/gram, respectively.

Both lithium disilicate and alkaline earth metal silicate glasses that crystallize to glass-ceramics during sintering have been employed to mix with the phyllosilicates. A preferred lithium disilicate glass is composed of, in calculated weight percent: 70.7% $SiO_2$, 4.5% $Li_2O$, 4.2% $K_2O$, 2.8% $Na_2O$, 4.6% $Al_2O_3$ and 3.2% $B_2O_3$.

Extrusion experiments were performed with 25:75, 50:50, and 75:25 by weight combinations of glasses and phyllosilicates. The best crystal orientation and sintering densities in the sintered bodies were obtained with the 50:50 mixes. Numerous dewaxing and sintering thermal cycles were evaluated employing heating rates varying from 50° C. to 1200° C./hr. Best results were obtained with slow heating rates and a top temperature of about 900° C.

The vapor phase treated talc or vermiculite was combined with six different lithium disilicate glasses to produce mixtures for ribbon extrusion trials. It was found possible to extrude ribbon with a 10:1 drawdown ratio by using a 50:50 combination of treated vermiculite with the lithium disilicate glass noted above. The extruded ribbons were 0.0015" (0.04 mm) thick and 0.75" (1.9 cm) wide, and had excellent green strength, that is, pre-sintered strength.

Diamond indentation toughness measurements on the sintered bodies revealed that the epitaxially extruded, vermiculite-glass ribbons, when stacked and sintered to form bars, produced bodies having toughness characteristics comparable to alumina and canasite glass-ceramics. Sintered grain size was observed to be in the three to five micron range. Surface x-ray diffraction data showed excellent phyllosilicate basal orientation within the sintered ribbons with 80% intensity at the 002 line, as compared to 14% in an unextruded powder control. A number of the sintered composites were observed to have an extremely fine-grained microstructure with basal cleavage and an interlocking type structure.

By way of further illustrating the properties of the extruded, sintered bars, a series of varied property measurements was made on a body prepared from a 50-50 mixture of vermiculite and a glass having a composition approximating that of lithium disilicate. The recorded measurements are set forth in TABLE V together with corresponding measurements on alternative materials commercially available. Hardness is given in Knoop values obtained with a 100 gram weight. Toughness is measured in ergs/cm$^2$ at 298° K. with a standard four point suspension, and the value is the point on the curve at which brittle fracture occurs. Dielectric constant is measured at 25° C. and 1 M Hertz, while volume resistivity is measured in ohm-cms at 25° C. Permeability is to helium at 25° C., and the values are given in terms of (cm$^3$:mm)/(cm$^2$ S:cm.Hg).

TABLE V

| Hardness | |
|---|---|
| Canasite glass-ceramic | 600–650 |
| Sintered $Al_2O_3$ | 1781 |
| Amorphous anorthite | 508 |
| Single crystal | 2000 |
| Test sample | 1000 |
| Toughness | |
| Glasses | 3500–4700 |
| Beta-spodumene glass-ceramic | 17,500 |
| Sapphire | 32,000 |
| Test sample | 18,000–26,000 |
| Dielectric Constant | |
| Beta-spodumene glass-ceramic | 5.5 |
| Test sample | 5.0 |
| Volume Resistivity | |
| Beta-spodumene glass-ceramic | $>14 \times 10^{10}$ |
| Test sample | $10 \times 10^{10}$ |
| Permeability | |
| 96% silica glass | $1 \times 10^{-10}$ |
| Test sample | $1 \times 10^{-12}$ |

TABLE VI sets forth several lithium disilicate glass compositions in weight percent as calculated from the glass batch on an oxide basis.

TABLE VI

| | Example | | | | | |
|---|---|---|---|---|---|---|
| | 7 | 8 | 9 | 10 | 11 | 12 |
| $SiO_2$ | 77.6 | 78.2 | 73.6 | 62.5 | 70.6 | 70.6 |
| $Al_2O_3$ | — | — | — | — | — | 4.6 |
| BaO | — | 6.3 | 5.8 | 12.3 | — | — |
| $B_2O_3$ | — | — | — | — | 6.4 | 3.2 |
| $Li_2O$ | 16 | 15.5 | 14.6 | 12.4 | 14.5 | 14.5 |
| ZnO | 3 | — | — | — | — | — |
| $Na_2O$ | — | — | — | — | — | 2.8 |
| $K_2O$ | 3.4 | — | — | — | 8.6 | 4.2 |
| CaO | — | — | 2.1 | 4.5 | — | — |
| SrO | — | — | 3.9 | 8.3 | — | — |

These compositions were formulated as glass batches which were melted by being held at 1400° C. for four hours. The melts were quenched and the glass pulverized to an average particle size of 1-2 microns. The pulverized glass was mixed with a proportionate amount of phyllosilicate in a slurry that was then dried and fired.

Firing temperatures from 300° to 1000° C., and heat-up rates from 25°/hour to 1000° hour, were investigated. Fast rates and higher top temperatures favored a light, low density, foam-like body, while bodies with high density were obtained with low rates and/or lower top temperatures. A basic consideration for high density is to obtain glass flow and wetting of the phyllosilicate prior to crystallization.

I claim:

1. A crystallized glass nanocrystalline particle which is a zinc pyrophosphate, has a minor dimension in the range of 0.1 to 100 Angstrom units and has a platey form in which the aspect ratio is grater than one.

2. A crystallized glass nanocrystalline particle which is a lithium disilicate crystal which has a minor dimension in the range of 0.1 to 100 angstrom units, and which has a platey form in which the aspect ratio is greater than one.

3. A glass or crystallized glass nanocrystalline particle containing phosphorous, having nitrogen bonded to at least a portion of the phosphorous, having a minor dimension in the range of 0.1 to 100 Angstrom units and having a platey form in which the aspect ratio is greater than one.

* * * * *

UNITED STATES PATENT AND TRADEMARK OFFICE
CERTIFICATE OF CORRECTION

PATENT NO. : 5,173,454

DATED : December 22, 1992

INVENTOR(S) : Hermann L. Rittler

It is certified that error appears in the above-identified patent and that said Letters Patent is hereby corrected as shown below:

Column 2, lines 6 and 7, after "(Hood" insert
-- et al.). No. 2,480,672 (Plank) describes using a--.

Column 4, line 26, change "c" to --C--.

Column 4, line 53, change "circular" to --acicular--.

Column 5, line 2, change "4.5%" to --14.5%--.

Column 5, line 54, change " $(cm^3:mm)/(cm^2 S:cm.Hg)$ " to
-- $(cm^3:mm)/(cm^2:S:cm \cdot Hg)$ --.

Signed and Sealed this

Thirtieth Day of November, 1993

Attest:

BRUCE LEHMAN

Attesting Officer

Commissioner of Patents and Trademarks